(12) United States Patent
Sodo et al.

(10) Patent No.: US 9,777,626 B2
(45) Date of Patent: Oct. 3, 2017

(54) ARRANGEMENT FOR AND A METHOD OF MAINTAINING THE ALIGNMENT OF AN INTERNAL COMBUSTION ENGINE, AND A METHOD OF ALIGNING AN INTERNAL COMBUSTION ENGINE AND MAINTAINING ITS ALIGNMENT

(75) Inventors: Tomas Sodo, Mustasaari (FI); Jan Holmberg, Vaasa (FI)

(73) Assignee: WARTSILA FINLAND OY (FI)

( * ) Notice: Subject to any disclaimer, the term of this patent is extended or adjusted under 35 U.S.C. 154(b) by 524 days.

(21) Appl. No.: 14/112,810

(22) PCT Filed: Apr. 16, 2012

(86) PCT No.: PCT/FI2012/050371
§ 371 (c)(1),
(2), (4) Date: Oct. 18, 2013

(87) PCT Pub. No.: WO2012/143605
PCT Pub. Date: Oct. 26, 2012

(65) Prior Publication Data
US 2014/0041616 A1    Feb. 13, 2014

(30) Foreign Application Priority Data
Apr. 19, 2011   (FI) ...................................... 20115381

(51) Int. Cl.
*F02B 75/06*      (2006.01)
*F02B 77/00*      (2006.01)
(Continued)

(52) U.S. Cl.
CPC ............ *F02B 77/00* (2013.01); *B60K 5/1283* (2013.01); *F16F 15/027* (2013.01); *B60K 5/02* (2013.01)

(58) Field of Classification Search
CPC ....... B60K 5/1283; B60K 17/10; F16F 13/26; F16F 15/02; B60G 15/067
(Continued)

(56) References Cited

U.S. PATENT DOCUMENTS 4,762,306 A * 8/1988 Watanabe ............ B60K 5/1283
                                            123/192.1
5,101,929 A    4/1992 Tobias
(Continued)

FOREIGN PATENT DOCUMENTS

CN         01702348 A     11/2005
CN         101725664 A     6/2010
(Continued)

OTHER PUBLICATIONS

International Search Report and Written Opinion, completed on Jan. 11, 2013, and mailed on Jan. 23, 2013, for corresponding PCT International Application No. PCT/FI2012/050371.

*Primary Examiner* — Marguerite McMahon
*Assistant Examiner* — James Kim
(74) *Attorney, Agent, or Firm* — Heslin Rothenberg Farley & Mesiti, P.C.; Victor Cardona, Esq.

(57) ABSTRACT

An arrangement and method for maintaining an alignment of an internal combustion engine by utilizing an arrangement includes a number of fluid springs by means of which the engine is mounted on a foundation thereof, control valves arranged in communication with each fluid spring, at least three position sensors in communication with the engine, and an electronic control unit. The electric control unit is provided with preset engine position values. The method includes collecting engine position information to the electric control unit, comparing the position information to preset position values, determining, if the position information differs from the preset position values, such control valves that need to be operated, calculating the corrective
(Continued)

measures, and giving corrective instructions to the control valves.

11 Claims, 4 Drawing Sheets

(51) Int. Cl.
*B60K 5/12* (2006.01)
*F16F 15/027* (2006.01)
*B60K 5/02* (2006.01)

(58) Field of Classification Search
USPC ............ 123/192.1; 267/64.16–64.27, 140.14
See application file for complete search history.

(56) References Cited

U.S. PATENT DOCUMENTS

| | | | | |
|---|---|---|---|---|
| 5,145,156 A | * | 9/1992 | Muramatsu | F16F 13/26 180/300 |
| 5,159,554 A | * | 10/1992 | Buma | B60G 17/0155 280/5.513 |
| 5,360,080 A | * | 11/1994 | Yamazaki | F16F 15/02 180/300 |
| 5,848,663 A | * | 12/1998 | Kuriki | B60G 17/0195 180/300 |
| 6,623,318 B1 | * | 9/2003 | Kantola | B63H 21/30 248/562 |
| 7,513,491 B2 | * | 4/2009 | Ogawa | F16F 13/149 267/140.11 |
| 7,946,561 B2 | * | 5/2011 | Nemoto | F16F 13/26 123/352 |
| 8,632,061 B2 | * | 1/2014 | Nemoto | B60K 5/1283 267/140.11 |
| 2003/0025255 A1 | * | 2/2003 | Gade | F16F 13/305 267/140.15 |
| 2006/0038331 A1 | * | 2/2006 | Ogawa | F16F 13/149 267/140.14 |
| 2009/0039577 A1 | * | 2/2009 | Ishiguro | B60K 5/1283 267/140.13 |
| 2009/0102105 A1 | * | 4/2009 | Hasegawa | F16F 13/262 267/122 |
| 2009/0276098 A1 | * | 11/2009 | Bodie | F16F 13/305 700/280 |
| 2010/0096789 A1 | * | 4/2010 | Gannon | B60K 5/1266 267/140.15 |
| 2010/0244341 A1 | | 9/2010 | Nemoto | |
| 2011/0042872 A1 | * | 2/2011 | Hasegawa | F16F 13/26 267/140.14 |

FOREIGN PATENT DOCUMENTS

| | | |
|---|---|---|
| CN | 201723643 U | 1/2011 |
| EP | 2023008 A1 | 2/2009 |
| EP | 2233339 A1 | 9/2010 |
| JP | S5643026 A | 4/1981 |
| JP | 61146630 A | 7/1986 |
| JP | H04302739 A | 10/1992 |
| JP | 2000255277 A | 9/2000 |
| JP | 2002019475 A | 1/2002 |

* cited by examiner

ARRANGEMENT FOR AND A METHOD OF MAINTAINING THE ALIGNMENT OF AN INTERNAL COMBUSTION ENGINE, AND A METHOD OF ALIGNING AN INTERNAL COMBUSTION ENGINE AND MAINTAINING ITS ALIGNMENT

CROSS-REFERENCE TO RELATED APPLICATIONS

This application is a 371 National Phase of PCT International Application No. PCT/FI2012/050371 filed on Apr. 16, 2012, and published in English as WO 2012/143605 A2 on Oct. 26, 2012, which claims priority to Finnish Patent Application No. 20115381 filed on Apr. 19, 2011, the entire disclosures of which are incorporated herein by reference.

TECHNICAL FIELD

The present invention relates to an arrangement for maintaining the alignment of an internal combustion engine in accordance with the preamble of claim 1, a method of maintaining the alignment of an internal combustion engine in accordance with the preamble of the first independent method claim, and a method of aligning an internal combustion engine and maintaining its alignment in accordance with the preamble of the second independent method claim.

BACKGROUND ART

Internal combustion engines have traditionally been installed such that the transfer of engine vibrations and noise to the surrounding structures is kept as small as easily possible. Normally this is achieved by mounting the engine by means of resilient rubber mounts on the mounting frame of the power plant or of the vehicle, be it a car, a truck or a marine vessel. Lately, the demands for further lessening the vibrations and noise has resulted in improving the insulation degree by moving the natural frequencies further away from excitation frequencies. This has been done by reducing the stiffness of the mounting system, i.e. the engine mounts. Thus, soft engine mounts are therefore needed in applications with strict vibration and noise requirements. However, firstly, soft engine mounts as such inevitably results in heavy movement of the engine during operation and requires special attention. And secondly, when using soft rubber mounts the creep rate is high and frequent re-alignment of the engine is needed, which is a costly and time consuming task for the engine operator.

As an example of prior art documents that at least partially touch upon the above discussed problems JP-A-2002019475 may be mentioned. The JP document discloses the use of engine mounts each having an air chamber, which is partitioned by a diaphragm. In accordance with the JP document the characteristics of the engine mounts are adjusted by means of changing the volume of their air chambers simultaneously by supplying air therein or exhausting air therefrom. The air chambers are arranged to be in communication with either the atmospheric air or the air intake passage between the throttle valve and the engine. A change over valve controls the communication of the air chambers such that the air chambers may be emptied or filled when needed. The operational status of the engine, like rotational speed, the position of the gas pedal etc. dictates whether the gas chambers are to be emptied or filled. The basic idea is that when the engine is in idle operation the engine mounts are set to soft position, i.e. gas chambers are filled with gas, and when the engine is in its non-idle operating condition the engine mounts are set to hard position i.e. gas is discharged from the air chambers.

Though the hydraulic and/or pneumatic engine mounts of prior art may not share the problem of soft rubber mounts, i.e. the high creep rate requiring regular re-alignment of the engine, they do not pay any attention to possible changes in the alignment of the engine between different operational conditions.

Thus, an object of the present invention is to introduce a novel arrangement of mounting an internal combustion engine such that its alignment is maintained in all operational conditions of the engine.

Another object of the present invention is to introduce a novel method of maintaining the alignment of an internal combustion engine while the engine is running.

Yet another object of the present invention is to introduce a novel method of aligning an internal combustion engine it is mounted and maintaining its alignment while the engine is running.

DISCLOSURE OF THE INVENTION

The above and other objects of the invention are met by an arrangement for maintaining the alignment of an internal combustion engine, the engine being mounted on its foundation by means of a number of fluid springs, wherein
 a pressurized fluid supply is connected to the fluid springs by means of fluid lines,
 control valves are arranged in fluid lines in communication with each fluid spring,
 at least three position sensors are in communication with the engine,
 an electronic control unit (ECU) is in communication with the control valves and the position sensors.

The above and other objects of the invention are also met by a method of maintaining the alignment of an internal combustion engine by utilizing the arrangement comprising a number of fluid springs by means of which the engine is mounted on its foundation, the fluid springs being connected to a pressurized fluid supply by means of fluid lines; control valves arranged in fluid lines in communication with each fluid spring; at least three position sensors in communication with the engine; and an electronic control unit in communication with the control valves and the position sensors, the ECU being provided with preset engine position values, the method having the steps of:
 Collecting position information from the position sensors to the ECU,
 Comparing the position information to preset position values,
 Determining, if the position information differs from the preset position values, such control valves that need to be operated,
 Calculating the corrective measures,
 Giving corrective instructions to the determined control valves, and
 Opening communication by means of the determined control valves from the fluid springs to either the pressurized fluid source or the atmosphere.

The above and other objects of the invention are further met by a method of aligning an internal combustion engine and maintaining its alignment by utilizing the arrangement comprising a number of fluid springs by means of which the engine is mounted on its foundation, the fluid springs being connected to a pressurized fluid supply by means of fluid lines; control valves arranged in fluid lines in communication with each fluid spring; at least three position sensors in communication with the engine; and an electronic control unit in communication with the control valves and the position sensors, the method having the steps of:

Aligning the engine with a gearbox or a generator,
Applying fluid pressure to the fluid springs,
Activating the ECU,
Collecting correct engine position information from the position sensors to the ECU,
Storing the correct engine position information to the memory of ECU as preset position values,
Switching the ECU to monitor the engine position.

Other characteristic features of the apparatus for maintaining the alignment of an internal combustion engine and the method of maintaining the alignment of an internal combustion engine will become apparent from the appended dependent claims.

The present invention, when solving at least one of the above-mentioned problems, also brings about a number of advantages, of which a few have been listed in the following:

Good vibration insulation and low structure borne noise.
No creep and low maintenance.
Only initial alignment needed.
Low stress on connection bellows and flexible couplings.
Coupling with smaller misalignment tolerances may be used. (cheaper)
Engine can be mounted on steel or resin chocks.
Minimal customer solution engineering needed.
Possibility to type-approve mounting system.

However, it should be understood that the listed advantages are only optional, whereby it depends on the way the invention is put into practice if one or more of the advantages were obtained.

BRIEF DESCRIPTION OF DRAWINGS

In the following, the arrangement for, the method of maintaining the alignment of an internal combustion engine and the method of aligning an internal combustion engine and maintaining its alignment are explained in more detail in reference to the accompanying Figures, of which

DETAILED DESCRIPTION OF THE DRAWINGS

Figure 1:
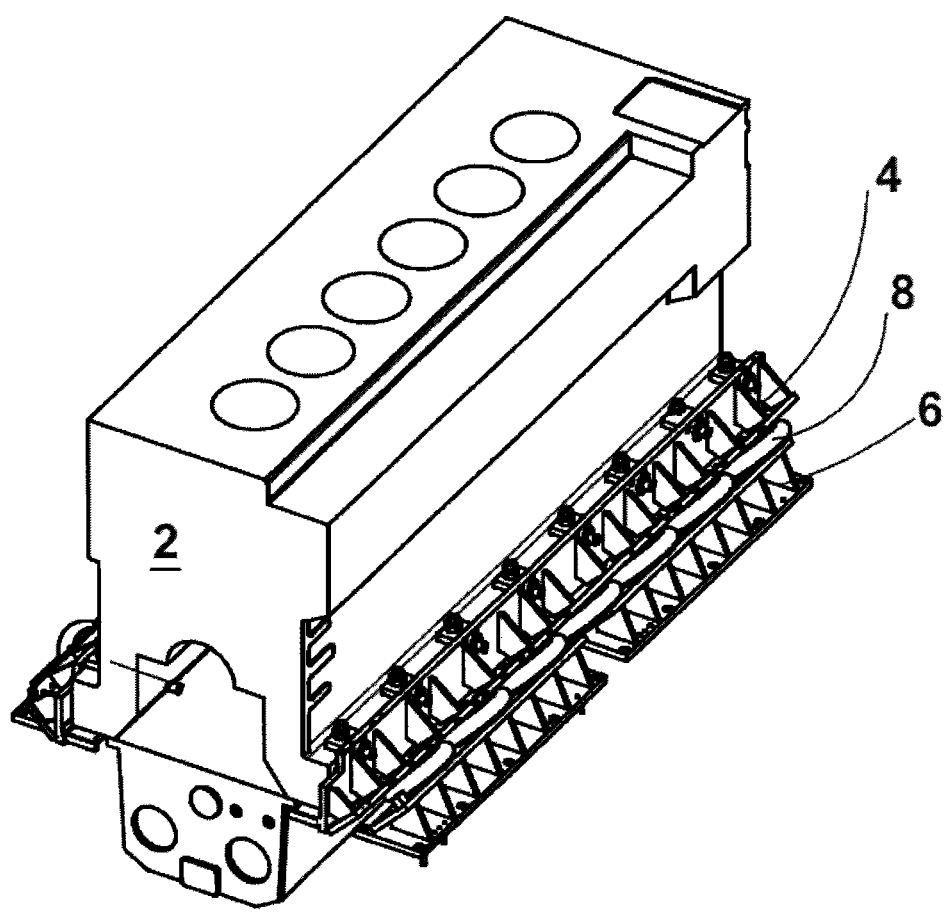
FIG. 1 illustrates a 3D-view of an internal combustion engine installed on the mounting arrangement in accordance with a preferred embodiment of the present invention.
Figure 2:
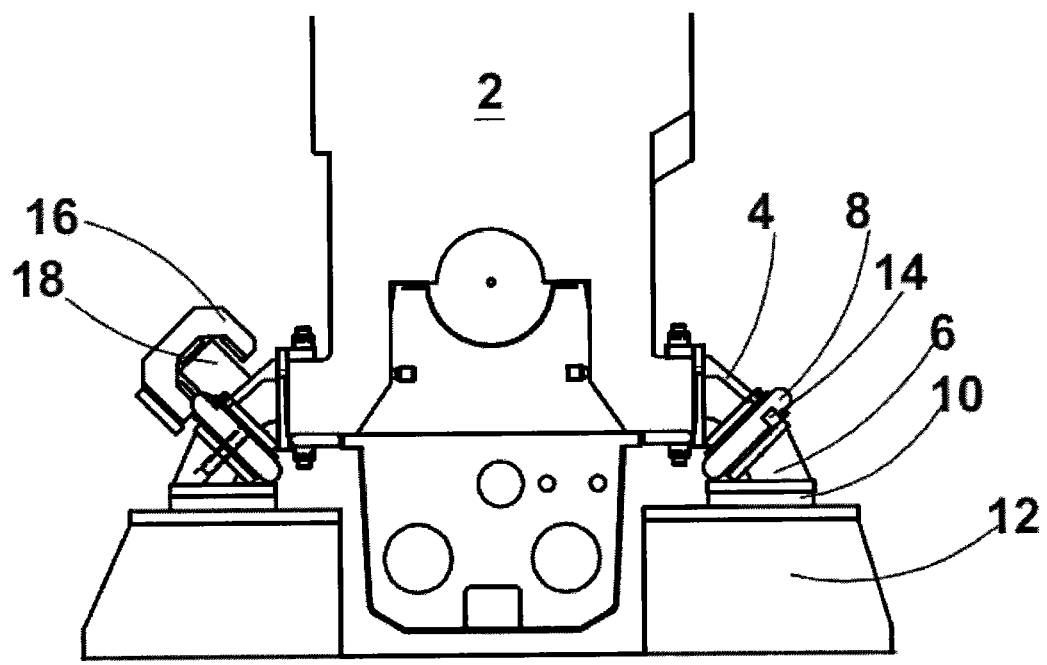
FIG. 2 illustrates an end view of an internal combustion engine installed on the mounting arrangement in accordance with a preferred embodiment of the present invention.
Figure 4:
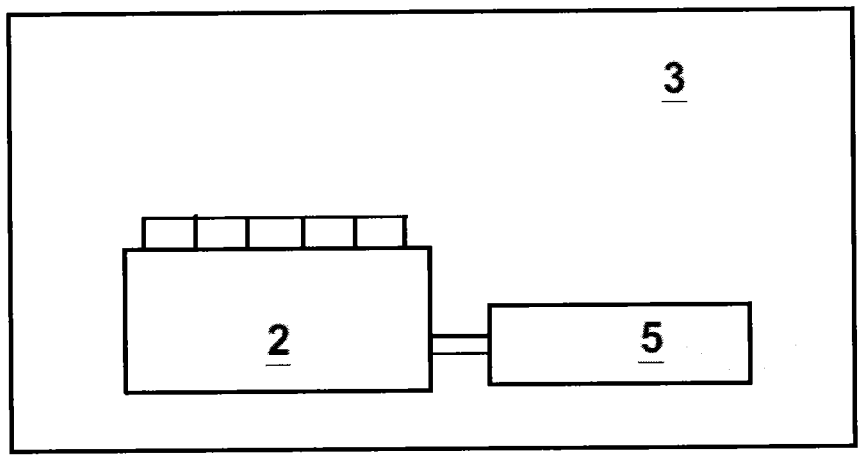
FIG. 4 illustrates schematically an engine coupled to a gearbox or a generator in a marine vessel or at a power plant.

FIG. 1 illustrates a 3D-view and FIG. 2 an end view of an internal combustion engine installed on the mounting arrangement in accordance with a preferred embodiment of the present invention. The internal combustion engine 2 of this exemplary embodiment has upper mounting brackets 4 fastened to the cylinder block on both longitudinal sides of the engine 2. The foundation 12 (shown only in FIG. 2) of the engine arranged to the marine vessel or to the powerplant 3 (FIG. 4) is provided with chocks 10 (also shown only in FIG. 2) and lower mounting brackets 6 on both longitudinal sides of the engine and facing the upper mounting brackets 4. As to the number of mounting brackets, both longitudinal sides of the engine require at least one upper and one lower mounting bracket. The upper limit for the number of bracket pairs (upper bracket-lower bracket) is the number of resilient engine mounts. The chocks 10 may be made of steel or resin. In this exemplary engine, eight resilient mounts, i.e. air, or gas, springs 8 have been arranged between the upper and lower brackets 4 and 6 at both sides of the engine 2 such that the, in total, sixteen air/gas springs 8 carry the weight of the engine 2 and also receive (and dampen as efficiently as possible) the engine-borne vibrations and noise. FIG. 2 illustrates somewhat better how the engine 2 is mounted by means of the air/gas springs 8. In other words, the air/gas springs 8 have been arranged in V configuration, on the foundation 12, or rather, on the lower brackets 6. By this configuration the air/gas springs 8 also dampen not only vertical movements but also horizontal movements or vibrations of the engine. In other words, the air/gas springs support the engine in both vertical and horizontal directions. The height of the engine mounts 8 is measured or determined by means of height sensors 14 arranged at the four corners of the engine 2. The mounting arrangement of the present invention also includes mechanical limiters 16 and 18 in order to prevent excessive misalignment of the engine in case of system failure.

Figure 3:
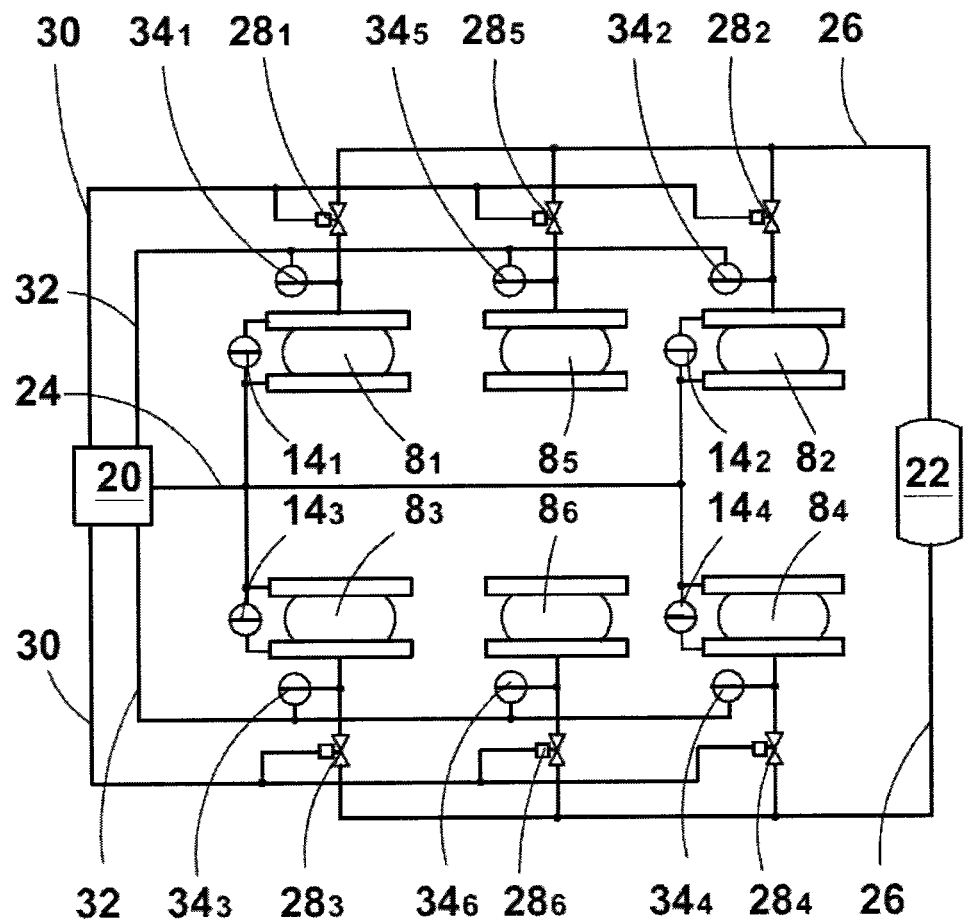
FIG. 3 illustrates a control arrangement for the mounting arrangement in accordance with a preferred embodiment of the present invention.

FIG. 3 illustrates in more detail the preferred control system by means of which the engine alignment is maintained irrespective of the seaway movements, load changes etc. For simplicity the control system shown in FIG. 3 illustrates only three air/gas springs on both longitudinal sides of the engine. The main components of the control system are an electronic control unit (ECU) 20, a pressurized air/gas supply 22, and the air/gas springs $8_1, 8_2, \ldots, 8_6$. Air/gas springs $8_1 \ldots 8_4$ are located at the four corners of the engine and the springs $8_5$ and $8_6$ between the air/gas springs at the corners. The heights of the air/gas springs $8_1 \ldots 8_4$ at the corners of the engine are measured by position sensors $14_1 \ldots 14_4$ and the height information is transferred by wiring 24 to the ECU 20. In fact, the heights of the gas springs $8_1 \ldots 8_4$ represent the position of the engine corners. In other words, the position sensors $14_1 \ldots 14_4$ may also be called/considered as the corner position sensors of the engine.

The pressurized air/gas supply 22 is connected by means of a piping 26 and control valves $28_1, 28_2, 28_3, \ldots, 28_6$ to the air/gas springs $8_1, 8_2, \ldots, 8_6$. The control valves $28_1, 28_2, 28_3, \ldots, 28_6$ may open communication from the air/gas springs $8_1, 8_2, \ldots, 8_6$ either to the pressurized air/gas supply 22 for filling the air/gas springs or to the atmosphere or any other gas collection arrangement, if such is needed, for discharging air/gas from the springs. Thus a control valve $28_n$ and an air/gas spring $8_n$ form a pair such that the valve $28_n$ controls the operation of the air/gas spring $8_n$. The ECU 20 is connected by means of wiring 30 to the control valves $28_1, 28_2, 28_3, \ldots, 28_6$ and wiring 32 to pressure sensors $34_1, 34_2, 34_3, \ldots, 34_6$ for transferring the pressure information from each air/gas spring $8_1, 8_2, \ldots, 8_6$ to the ECU 20. The main function of the control system is to adjust pressure in each air/gas spring $8_1, 8_2, \ldots, 8_6$ of each engine mount in order to compensate for any height or position variations at the corners of the engine. Pressure in the air/gas springs $8_1, 8_2, \ldots, 8_6$ is monitored by the ECU 20, too, in order to avoid overloading of springs $8_1, 8_2, \ldots, 8_6$ and to detect failure.

The functioning of the control system is discussed in more detail in the following. When the engine is aligned with the gearbox or generator 5 (FIG. 4), and the desired air/gas pressure is applied to the air/gas springs, the control system is activated. It means that the ECU 20 first reads the optimal engine corner positions from the position sensors $14_1 \ldots 14_4$ and stores the engine position information to the memory of ECU as preset engine position values; whereafter the control system is reset, i.e. the ECU 20 is switched to monitor the engine position. The ECU may be programmed to allow slight changes, i.e. a fluctuation range in a corner position until corrective measures are effected, or the ECU may be programmed to initiate corrective actions immediately after it has detected a change in a corner position. Thereafter the position information is collected either continuously or periodically from the position sensors $14_1 \ldots 14_4$. Based on the collected position information the ECU 20 aims at maintaining the corner positions of the engine within allowable limits input in the ECU. This means that if, for instance, a position sensor $14_2$ of a corner of the engine indicates that the corner has moved down, the ECU 20 instructs valve $28_2$ to allow air/gas from pressurized air/gas source 22 to flow into air/gas spring $8_2$ to lift the corner until the desired position or height of the corner is reached. In a similar manner and depending on the position information collected simultaneously from the other position sensors $14_1$, $14_3$ and $14_4$ the ECU 20 gives additional instructions to the other control valves. For instance, if the position sensor $14_3$ indicates that the corner of the engine it is installed at has moved up, and the other two position sensors $14_1$ and $14_4$ do not indicate any movement, the ECU 20 instructs also valve $28_5$ to allow some gas enter the air/gas spring $8_5$ in order to help the lifting of the engine corner where the position indicator $14_2$ is installed at, and valves $28_3$ and $28_6$ to allow air/gas from the springs $8_3$ and $8_6$, respectively, to escape to atmosphere. And as another example, if the position sensors $14_1$ and $14_2$ indicate that the engine is tilting to its one side i.e. the sensors $14_3$ and $14_4$ not informing any change in the engine position, the ECU 20 instructs all valves $28_1$, $28_5$ and $28_2$ to allow gas to flow in the air/gas springs $8_1$, $8_2$ and $8_5$ to maintain the engine in its desired position. In each case, by following preferably continuously the position information from the position sensors $14_1$, $14_2$, $14_3$ and $14_4$ the ECU is able to adjust the valves $28_1$, $28_2$, $28_3$, ..., $28_6$ also continuously whereby the position of the corners of the engine may be maintained easily within the prescribed acceptable limits.

In each case the ECU detects, based on the information received from the position sensors, that the engine is moving towards misalignment the ECU calculates the corrective measures needed, i.e. first determines which control valves need to be operated, and then the corrective adjustments of the control valves, i.e. in which direction to open and how much, and provides the control valves with corresponding instructions to perform the corrective action, i.e. open communication from the air/gas springs to either the pressurized air/gas supply or the atmosphere. In a static situation the valves are closed.

It should be understood that the above is only an exemplary description of a novel and inventive mounting system for an internal combustion engine. It should be understood that the specification above discusses only the most preferred embodiment of the present invention without any purpose to limit the invention to only the discussed embodiment and its details. In other words, it is within the scope of the invention that in place of the air/gas springs also hydraulic springs are used. By hydraulic springs are understood such springs that have hydraulic fluid acting as the medium changing the volume (i.e. height) of the spring, and either a closed air/gas chamber within the spring or the rubber parts of the spring giving the required resiliency. Thereby the terms 'fluid spring', 'fluid line' and 'pressurized fluid source' are used in the claims. In case the pressure medium is liquid, the term 'atmospheric' or 'atmosphere' in the claims should be understood as a liquid reservoir at a preferably atmospheric pressure, or at a pressure significantly lower than that in the pressurized fluid source. In a similar manner it should be understood that the number of position sensors is by no means limited to four, but, for instance, three sensors is sufficient as long as the sensors are not arranged on the same line. In other words, any triangular sensor positioning may be applied. In practice, there should be at least two sensors on one side of the engine and at least one sensor at the opposite side of the engine. Based on the information collected from these three sensors, the ECU is able to instruct the control valves to correct any deviation from the optimal engine alignment. And further, the position sensors need not necessarily be at the corners of the engine, or in connection with the fluid springs, but any triangular position sensor arrangement will, in practice, suffice.

Thus the above specification should not be understood as limiting the invention by any means but the entire scope of the invention is defined by the appended claims only. From the above description it should be understood that separate features of the invention may be used in connection with other separate features even if such a combination has not been specifically shown in the description or in the drawings.

The invention claimed is:

1. An arrangement for compensating any height variations at corners of an internal combustion engine of a marine vessel or a power plant and for maintaining the alignment of the internal combustion engine in relation to a gearbox or a generator, the engine being mounted on a foundation by means of a number of fluid springs, the arrangement comprising:
   a fluid supply pressurized above atmospheric pressure and connected to a plurality of fluid springs by means of fluid lines,
   control valves arranged in fluid lines in communication with each fluid spring of said plurality of fluid springs,
   at least three height sensors arranged in connection with the engine,
   an electronic control unit (ECU) in communication with the control valves and the height sensors, the ECU having a memory, and the ECU being configured:
   to store preset engine height values in the memory,
   to collect engine height information from the height sensors,
   to compare the collected engine height information to preset engine height values and, if needed,
   to instruct at least one control valve to allow air/gas to flow into or to escape from at least one fluid spring for maintaining the engine in a desired preset height based on the preset engine height values.

2. The arrangement as recited in claim 1, wherein said height sensors are in communication with each fluid spring and the ECU.

3. The arrangement as recited in claim 1, wherein said at least two height sensors are located on one side of the engine and at least one height sensor at the opposite side of the engine.

4. The arrangement as recited in claim 1, wherein said height sensors are arranged at corners of the engine.

5. The arrangement as recited in claim 1, wherein said height sensors are arranged at each corner of the engine.

6. The arrangement as recited in claim 1, wherein said control valves are arranged to open communication from the fluid springs to either the pressurized fluid source or to the atmosphere.

7. The arrangement as recited in claim 1, wherein each fluid spring of the fluid springs is arranged between an upper bracket fastened to the engine and a lower bracket fastened to the foundation, and a first height sensor of the height sensors is arranged to measure a height of a first fluid spring of the fluid springs between the upper and lower brackets.

8. The arrangement as recited in claim 1, wherein said at least three height sensors comprise three height sensors arranged in triangular positioning.

9. A method of compensating any height variations at corners of an internal combustion engine of a marine vessel or a power plant in order to maintain an alignment of the internal combustion engine in relation to a gearbox or a generator by utilizing the arrangement of claim 1, the arrangement comprising a number of fluid springs by means of which the engine is mounted on the foundation, the fluid springs being connected to a fluid supply pressurized above atmospheric pressure by means of fluid lines; control valves arranged in fluid lines in communication with each fluid spring; at least three height sensors in connection with the engine; and an electronic control unit (ECU) in communication with the control valves and the height sensors, the ECU (20) having a memory in which preset engine height values are stored, the method comprising the steps of:
 a) Collecting engine height information from the height sensors to the ECU,
 b) Comparing the engine height information to preset engine height values,
 c) Determining, if the engine height information differs from the preset engine height values, such control valves that need to be operated,
 d) Calculating the corrective measures,
 e) Giving corrective instructions to the determined control valves, and
 f) Opening communication by means of the determined control valves from the fluid springs to either the pressurized fluid source or the atmosphere.

10. A method of compensating any height variations at corners of an internal combustion engine in order to align the internal combustion engine of a marine vessel or a power plant and to maintain its alignment in relation to a gearbox or a generator by utilizing the arrangement of claim 1, the arrangement comprising a number of fluid springs by means of which the engine is mounted on its foundation, the fluid springs being connected to a fluid supply pressurized above atmospheric pressure by means of fluid lines; control valves arranged in fluid lines in communication with each fluid spring; at least three height sensors in connection with the engine; and an electronic control unit in communication with the control valves and the height sensors, the method comprising the steps of:
 a) Aligning the engine with a gearbox or a generator,
 b) Applying fluid pressure to the fluid springs,
 c) Activating the ECU having a memory,
 d) Collecting correct engine height information from the height sensors to the ECU,
 e) Storing the correct engine height information to the memory of ECU as preset engine height values,
 f) Switching the ECU to monitor the engine height.

11. The method as recited in claim 10, comprising the steps of
 g) Collecting engine height information from the height sensors to the ECU,
 h) Comparing the engine height information to preset engine height values,
 i) Determining, if the engine height information differs from the preset engine height values, such control valves that need to be operated,
 j) Calculating the corrective measures,
 k) Giving corrective instructions to the determined control valves, and
 l) Opening communication by means of the determined control valves from the fluid springs to either the pressurized fluid source or the atmosphere.

* * * * *